June 16, 1959  E. E. SCHNELL  2,890,666
GRAIN DRILL GATE OPERATING ARRANGEMENT
Filed Feb. 1, 1955  4 Sheets-Sheet 1
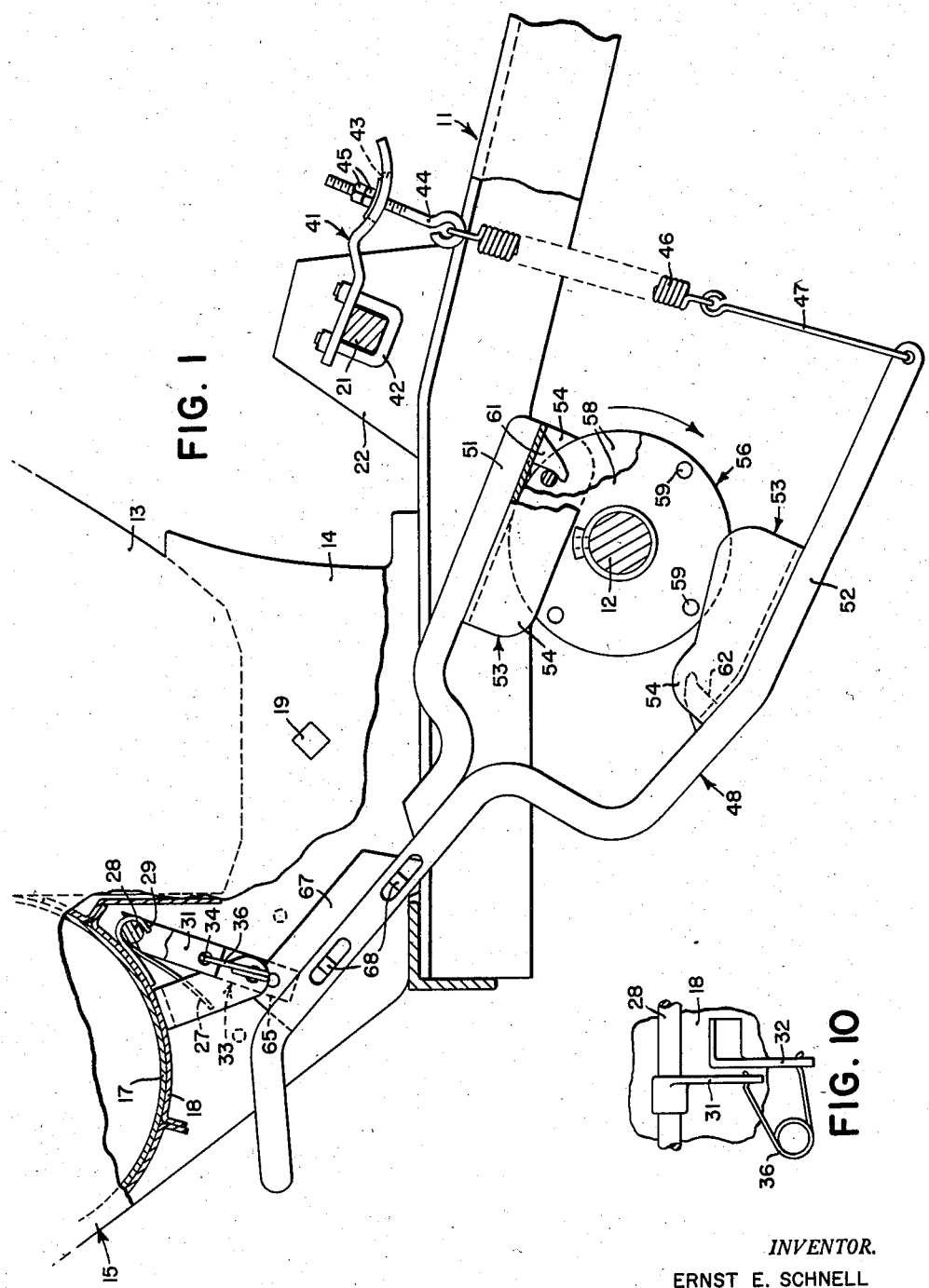
INVENTOR.
ERNST E. SCHNELL
BY
ATTORNEYS

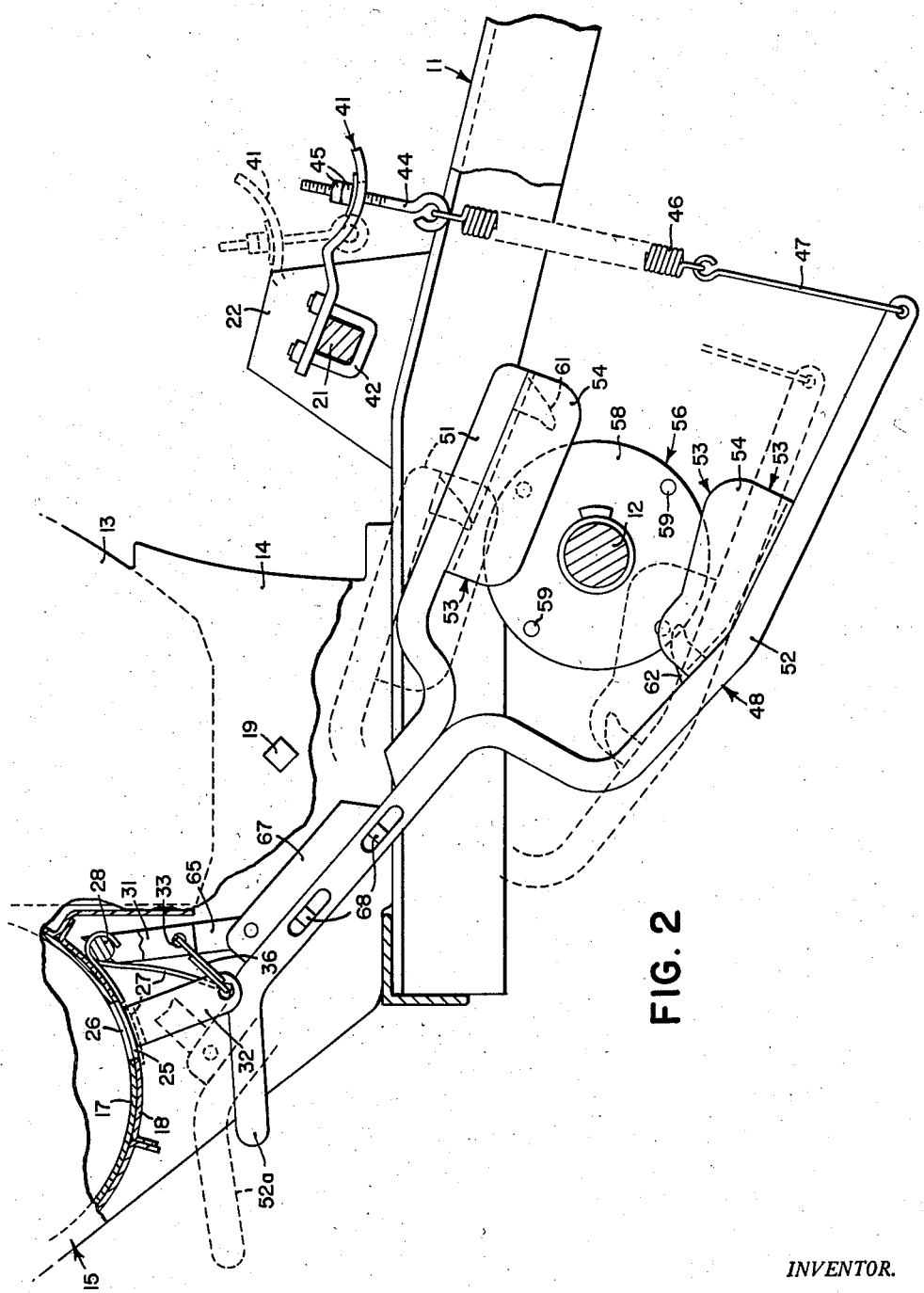

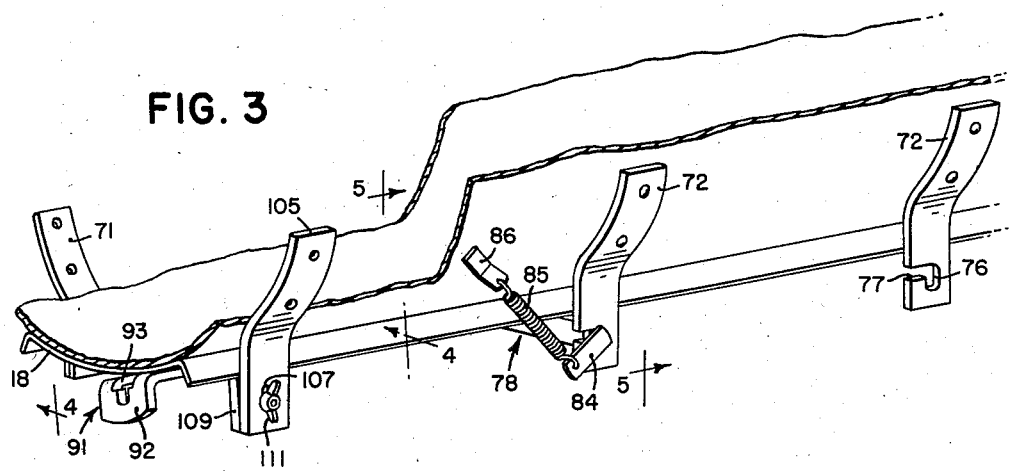
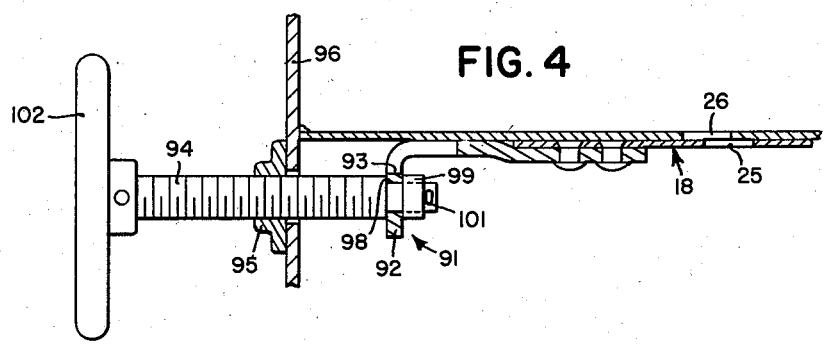
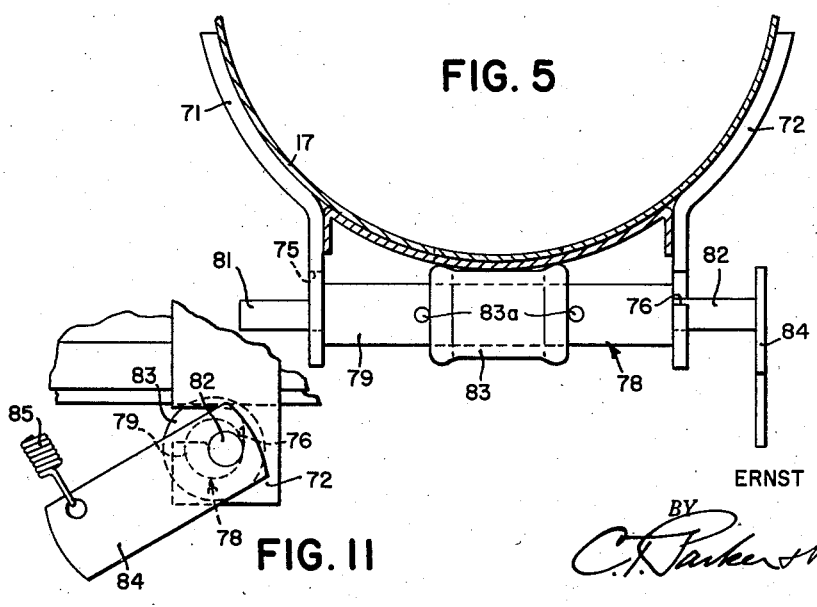

June 16, 1959 E. E. SCHNELL 2,890,666
GRAIN DRILL GATE OPERATING ARRANGEMENT
Filed Feb. 1, 1955 4 Sheets-Sheet 4

INVENTOR.
ERNST E. SCHNELL
BY
ATTORNEYS

United States Patent Office

2,890,666
GRAIN DRILL GATE OPERATING ARRANGEMENT

Ernst E. Schnell, West Bend, Wis., assignor, by mesne assignments, to Deere & Company, a corporation of Delaware Application February 1, 1955, Serial No. 485,493

6 Claims. (Cl. 111—67)

The present invention relates generally to agricultural implements and more particularly to material-dispensing implements, such as fertilizer distributors, for example, constructed and arranged to be drawn across a field for the purpose of distributing material, such as fertilizer or the like, onto the field.

The object and general nature of the present invention is the provision of a new and useful fertilizer attachment constructed and arranged to be connected with a grain drill of the type having furrow openers and means incorporated in the grain drill for raising and lowering the furrow openers. A further feature of this invention is the provision of a fertilizer attachment for grain drills and the like, in which auxiliary gate means is provided, with mechanism for opening and closing said gate means in response to the lowering and raising, respectively, of the furrow openers of the grain drill. Another feature of this invention is the provision of an adjustable discharge or flow-controlling slide, with new and improved means for releasably holding the slide in position on the bottom portion of the fertilizer hopper. Another feature of this invention is the provision of auxiliary gate control means in the form of an overcenter spring device adapted to urge the gate means into their fully opened position or into their fully closed position, with means for manually closing the gate means, even though the furrow openers of the grain drill are in their lowered position, in which normally the gate means is opened.

A further and important feature of this invention is the provision of means for opening and closing the gate means so constructed and arranged as to be responsive to forward travel of the implement, such opening and closing means being so constructed and arranged that the movement of one part from one position to another utilizes the forward travel of the implement as means for opening or closing the gates that control the flow of material from the fertilizer attachment. It is also a feature of this invention to provide new and improved slide supporting means whereby the slide may readily be removed from the hopper, as for the purpose of cleaning or the like. Such slide-holding means may take either of two forms, one in the nature of a spring-biased cam, which permits the slide to move away from the bottom of the hopper a limited distance, and for a number of times, or such means may take the form of a simplified slide support in which the slide is carried detachably in a pair of supporting parts one or both of which are adjustable relative to the hopper for determining the clearance between the slide and the hopper bottom.

These and other objects and advantages of the present invention will be apparent to those skilled in the art after a consideration of the following detailed description, taken in conjunction with the accompanying drawings, in which:

Fig. 1 is a side view, with certain parts shown in section, of a fertilizer type grain drill in which the principles of the present invention have been incorporated.

Fig. 2 is a view similar to Fig. 1, showing the position of the gate-controlling parts in the fully opened position and also in the fully closed position of the auxiliary flow- or discharge-control gate means.

Fig. 3 is a fragmentary perspective view showing one form of means holding the adjustable slide in position along the bottom of the fertilizer hopper.

Fig. 4 is a generally diagrammatic sectional view taken along the plane of the line 4—4 of Fig. 3, with certain parts added to Fig. 4 that are not shown in Fig. 3.

Fig. 5 is a sectional view taken generally along the line 5—5 of Fig. 3.

Fig. 10 is a fragmentary detail view showing the gate-biasing spring means.

Fig. 11 is a fragmentary end view of one of the gate-holding cam members, showing the manner in which the cam member may be inserted in place in the associated bracket.

Figure 6:
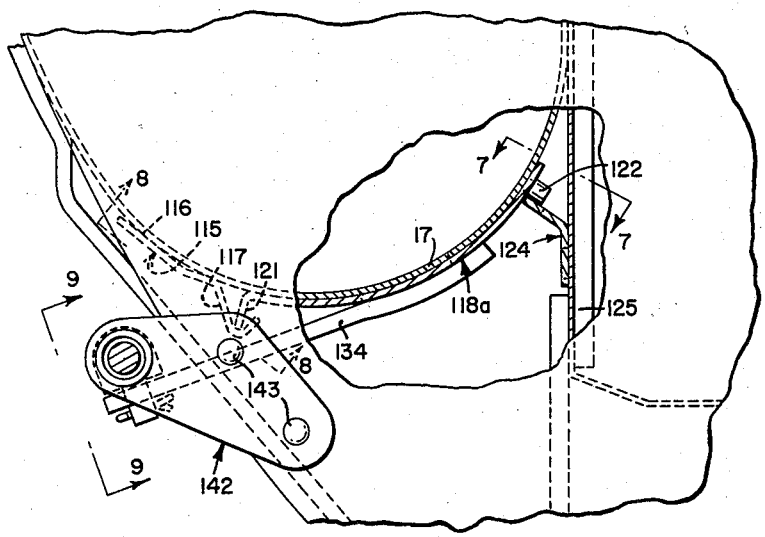
Fig. 6 is a fragmentary end view of a fertilizer hopper mounted in place on a grain drill, showing a modified form of slide and slide-retaining means.
Figure 7:
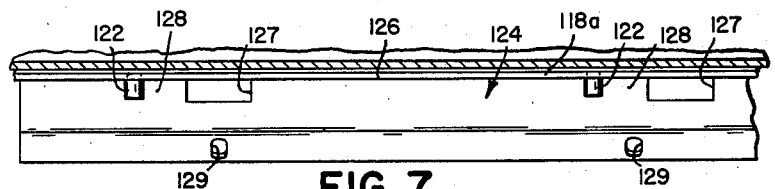
Fig. 7 is a fragmentary sectional view taken generally along the line 7—7 of Fig. 6, showing the front slide support member and associated parts.
Figure 8:
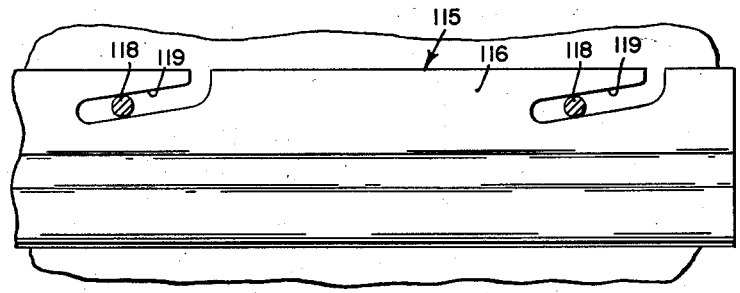
Fig. 8 is a fragmentary sectional view taken generally along the line 8—8 of Fig. 6, showing the rear slide support member and associated parts.
Figure 9:
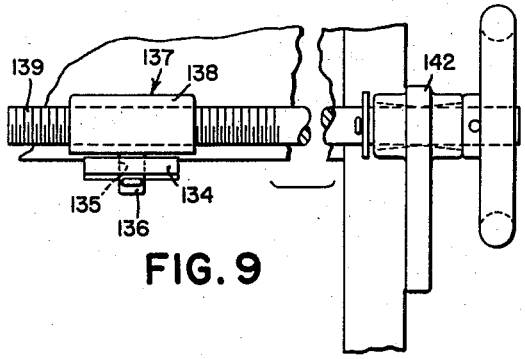
Fig. 9 is a view taken generally along the line 9—9 of Fig. 6, showing the slide-adjusting means employed in the form of the invention shown in Fig. 6.

Referring first to Fig. 1, the principles of the present invention have been shown as embodied in a fertilizer-type grain drill in which a frame 11 is carried by suitable supporting ground wheels (not shown) through suitable means such as a rotatable shaft 12 disposed generally transversely of the frame. The latter also supports a seed hopper 13, as through suitable end plates 14, and a fertilizer hopper 15 having a lower arcuate bottom 17 in which a plurality of discharge openings are provided. The shaft 12 is connected with the aforesaid ground wheels and in this description represents means that is moved or driven in response to travel of the grain drill. The hopper 15 also contains suitable agitating means (not shown) and fertilizer dispensing means, and flow of fertilizer material from the hopper 15 is controlled by a slide 18 that is carried along the underside of the hopper bottom 17, preferably by means to which reference will be made in detail later. The slide 18, which can be considered as a part of, and in this description as representing, the aforesaid dispensing means, is movable generally longitudinally of the transversely disposed fertilizer hopper 15. The agitating means in the hopper 15, and suitable seed-selecting means, which is driven by a seeding shaft 19, are actuated by any suitable drive connections from the shaft 12. The present invention is not particularly concerned with the details of the drive connections, it being sufficient for purposes of the present disclosure to note that they are generally similar to the arrangement shown in the U.S. Patent 2,561,235, issued July 17, 1951 to Schmutzler, to which reference may be made if necessary. Also, the grain drill in which the principles of the present invention have been incorporated includes ground-engaging furrow openers and furrow opener raising and lowering means, similar to that shown, for example, in U.S. Patent 2,520,345, issued August 29, 1950 to Starr, to which reference may also be made if necessary. Such furrow opener raising and lowering means includes a transverse rockshaft 21 supported in brackets 22 for rocking movement. The rockshaft 21 may be actuated by any suitable means, either by hand or power, as desired, but in present-day farm implements power means is generally available.

According to the principles of the present invention, the discharge-controlling slide 18, which is provided with a plurality of openings 25 cooperating with openings 26 formed in the hopper bottom 17, carries flow control means which preferably takes the form of a plurality of flow-controlling gates 27, one for each of the openings 25, the gates 27 being fixed, as by welding or the like, to a rockshaft 28 carried by the gate through suitable bearing means 29. In the broader aspects of my invention, the flow controlling gates 27 and associated parts represent any suitable controllable operating means. The purpose of the flow-controlling gates 27 is to shut off the flow of fertilizer through the openings 25 and 26 when the machine is stopped in the field. It has been found that certain types of present-day fertilizers have a high degree of flowability, and therefore when the outfit is stopped, even though the discarge openings are almost closed and the agitator means in the hopper is stationary, the fertilizer tends to run out of the hopper. According to the present invention, the gates 27 are normally held either in their fully opened position (full lines, Fig. 2) or in their fully closed position (dotted lines, Fig. 2). To this end, spring-biased overcenter mechanism 33 is operatively associated with the rockshaft 28. Such mechanism comprises one or more arms 31 fixed in any suitable way to the rockshaft 28 and one or more standards 32 suitably fixed to the slide 18 adjacent the associated arms 31. Each arm 31 is apertured, as at 34, and each bracket 32 is likewise apertured. A biasing hairpin spring 36 is arranged with one end in the aperture 34 of each arm 31 and with its other end in the aperture in the associated bracket 32. These parts are shown in their dead-center position in Fig. 1, in which the gates 27 are substantially half-way between their fully opened position and their fully closed position. If the rockshaft 28, as shown in Fig. 1, should be moved slightly in one direction or the other, the spring or springs 36 will continue the movement and thus carry the gates into one or the other of their positions. The arm 31, bracket 32, spring 36 and associated parts constitute biased overcenter means that serves to hold the gates 27 in either a closed position or an open position.

According to the present invention, means is provided for closing the gates 27 when the furrow openers are raised and opening the gates 27 when the furrow openers are lowered. Thus, in normal operation, fertilizer flows from the hopper whenever the furrow openers are lowered, as for the customary drilling or seeding operation. When the furrow openers are raised out of the ground, as for transport, turning at the ends of the field, etc., the gates are closed. The means for opening and closing the gates in response to operation of the furrow-opener raising and lowering means will now be described.

An arm 41 is fixed, as by a U-bolt 42, to the rockshaft 21 and is provided with a slotted opening 43 in which an eye bolt 44, carrying a pair of lock nuts 45, is disposed. The lower or eye end of the bolt 44 receives the upper end of a spring 46, the lower end of which is connected by a link 47 to a gate-operating yoke member, indicated in its entirety by the reference numeral 48. The yoke member 48 and associated parts represents means that is connected with the drive shaft 12 and actuated thereby to shift the biased overcenter means through its dead-center position and thus actuate the gates 27 and control the flow of material through the slide 18. Specifically, the member 48 is bifurcated at its forward end, having an upper section 51 disposed above the shaft 12 and a lower section 52 disposed below the shaft 12, the latter section extending forwardly and pivotally receiving the lower end of the link 47. Each of the yoke sections 51 and 52 carries a channel-like part 53, each having side sections 54 disposed on opposite sides of a wheel-like part 56 that is fixed to rotate with the shaft 12. The wheel member 56 comprises a pair of disks 58 disposed in spaced apart relation and carrying a plurality of interconnecting transverse pins 59 that are adapted to engage either an upper tooth 61 carried by the upper member 53 or a lower tooth 62 carried by the lower member 53, according to whether the yoke member 48 is in a raised position or in a lowered position relative to the shaft 12. The latter normally rotates in the direction of the arrow shown adjacent the wheel member in Fig. 1. When the rockshaft 21 is rocked in a counterclockwise direction, as viewed in Fig. 1, the front end of the arm 41 is raised, and this raises the yoke member 48 so that the lower tooth 62 is in a position to be engaged by one of the pins 59 when the shaft 12 is rotated. On the other hand, when the rockshaft 21 is rocked in a clockwise direction, so as to lower the furrow openers, the front end of the arm 41 is lowered, and this acts through the spring 46 and link 47 to lower the forward portion of the yoke 48 so as to permit the upper tooth 61 of move downwardly into a position in the path of movement of the pins 59. The arm 41 and spring 46 constitute means to move the yoke 48 into engagement with the part 56 on the shaft 12. In the latter position, as shown in Fig. 1, the rotation of the shaft 12 turns the wheel-like member 56 and the pins 59 of the latter are adapted to engage the upper tooth 61 and shift the member 48 forwardly a limited amount but sufficient to move the arm 31 and spring 36 past a dead-center position (Fig. 1) so that the spring 36 immediately acts to complete the forward movement of the yoke member 48 to the position shown in full lines in Fig. 2. This swings an arm 65, which is fixed to the rockshaft 28, forwardly and thus acts through the rockshaft 28 to move the gates 27 to their wide-open position, as shown in full lines in Fig. 2.

When the rockshaft 21 is actuated to raise the arm 41, the yoke 48 is lifted to bring the lower tooth 62 into the path of movement of the pins 59, and this acts to shift the member 48 rearwardly, past the dead-center position shown in Fig. 1, so that the spring 36 acts to complete the rearward movement of the member 48, thus swinging the latter and the gates 27 to the completely closed position, as shown in Fig. 2 in dotted lines.

As will be seen from Figs. 1 and 2, the arm 65 is connected to the member 48 through a plate 67 and bolt and slot means 68, the latter serving as means accommodating a limited amount of adjustment of the plate 67 relative to the member 48 so that when the member 48 is shifted either to the fully opened gate position or the fully closed gate position, the teeth 61 and 62 are normally out of the path of rotation of the pins 59.

The present invention also contemplates means for manually closing the gates 27, even though the furrow openers are in their lowered position. The member 52 is extended rearwardly, as at 52a and the section 52a may be grasped manually and pulled back to swing the gates to their closed position (Fig. 2, dotted lines) even though the arm 41 is in its lowered position. This permits the operator to stop in the middle of the field, as for replenishing seed or the like, and by manually closing the gates 27, fertilizer will not leak out of the hopper 15 while the machine is standing stationary. However, according to the present invention, the operator does not have to remember to manually open the gates again before starting up for as soon as the shaft 12 begins to rotate it will engage the upper tooth 61, since the arm 41 is in its lowered position and the front end of the member 48 also lowered, and this will automatically swing the member 48 forwardly, thus opening the gates 27.

As mentioned above, the slide member 18 is adapted to be shifted longitudinally of the transverse hopper 15 for the purpose of controlling the amount of fertilizer discharged through the hopper openings 26. Any suitable means may be provided for supporting the slide 18 on the hopper to accommodate the above mentioned sliding movement, but perferably, according to the provisions of the present invention, the slide-supporting means is so constructed and arranged to accommodate ready and convenient detachability of the slide 18 from the bottom of the hopper to facilitate cleaning the slide and associated parts.

One form of slide-supporting means incorporating the principles of the present invention is shown in Figs. 3–5. Referring now to these figures, the front and rear sides of the hopper 15 are provided with a plurality of pairs of front and rear supporting strap members or brackets 71 and 72 secured in any suitable way to the sides of the hopper 15 so as to have depending portions extending below the bottom 17 of the hopper. The front brackets 71 are slotted, as at 75, and the rear brackets or strap members are provided with openings 76, each of which has a lateral extension 77 that provides for sidewise movement of the associated part into and out of the openings 76. Carried in each pair of brackets 71 and 72 is a rotatable cam member 78 having front and rear stems 81 and 82. The cam section 79 of each member 78 carries a slide-engaging roller 83 that is held in position on the part 79 by pins 83a and forms a partr of the cam member 78. The roller 80 is disposed, when the stems 81 and 82 are in the bottom portions of the openings 75 and 76 in the brackets 71 and 72, so as to engage the lower face of the slide 18. To attach the member 78, the front stem 81 is first inserted in the opening 75 of the front bracket 71, and then the rear stem 82 is passed through the extension 77 and into position in the openings 76 of the rear bracket 72. The rear stem 82 carries an arm 84 that is aperturned to receive one end of a spring 85, the other end of which is anchored to the hopper by a clip 86 or other suitable fastening means. The cam portion 79 is in the nature of an eccentric and the parts are so constructed and arranged that the tension in the spring 85 urges the roller 80 on the cam or eccentric section 79 into engagement with the lower side of the slide 18. The eccentric 79 is not ordinarily on its dead-center position and, therefore, if for any reason fertilizer should begin to build up on the slide 18, the cam or eccentric section 79, together with the arm 84, rocks downwardly to accommodate any downward displacement of the slide 18 due to the hardened fertilizer thereon or on the adjacent portions of the hopper bottom. The several cam members 78 are readily disconnected from the hopper to accommodate removal of the slide 18, merely by disconnecting one end of the spring 85 from the clip 86 and then turning the member 78 so as to lower the eccentric 79, whereupon the member 79 may be withdrawn from the openings 76 through the extension 77, and then withdrawn axially from the openings 75 in the front bracket 71.

According to the present invention, means is provided for shifting the slide 18 longitudinally of the hopper to control the discharge of fertilizer. To this end, as will be seen from Fig. 3, an end clip 91 is fixed to one end of the slide 18 and has a downward portion 92 provided with a buttonhole-type of opening 93 a portion of which extends into the horizontal part of the clip 91. An adjusting screw 94 is threaded into a fitting 95 fixed to the side 96 of the hopper 15 and the inner end of the screw 94 is reduced, as at 98, so as to extend through the smaller portion of the opening 93. A collar 99 is mounted on the reduced end 98 and is held in position by a pin or cotter 101, the collar 99 lying at the inner side of the downturned portion 92 of the end clip 91. In this way, as will be seen from Fig. 4, turning the screw 94, as by a handle 102 or the like, serves to shift the slide 18 in one direction or the other. The adjusting end of the slide 18 is held in place by means that, unlike the cam 78 and associated parts, does not accommodate any downward displacement of the slide. Where force is applied to the end of the slide to shift the same in one direction or the other, it has been found that downward displacement or the possibility of downward displacement should not be present. Accordingly, the present invention contemplates the provision of two end brackets 105 and 106 attached to the hopper 15 and extending below the slide 18, the downward extension being slotted, as at 107. An L-shaped guide block 109 is adjustably fixed to the lower portion of each of the brackets 105 and 106 by any suitable means, such as a wing nut and bolt arrangement 111. When it is desired to remove the slide 18, the wing nuts are removed and the guide blocks 109 are also removed, after which the slide 18 may be dropped down away from the hopper 15 as explained above. The opening 93 is so constructed and arranged that the downward movement of the slide 18 relative to the adjusting screw 94 is readily accommodated, as will be seen from Fig. 4.

The spring-biased cam members 78 form biased means acting continually to hold the slide 18 up against the bottom of the hopper, but in cases where a spring-biased action of this type is not desirable or necessary, the modified form of slide-holding means shown in Figs. 6 et seq. may be employed. Referring now to these figures, in this form of the invention a slide support 115 in the form of an elongated plate 116 is provided with a generally V-shaped ledge section 117 and is secured to the rear side of the hopper by means of a plurality of pins or studs 118 and associated angled slots 119 formed in the upper edge of the plate member 116. When the studs or bolts 118 are tightened, the member 115 is held against lateral displacement, and this holds the ledge section 117 in a given position relative to the bottom of the hopper. This position may be changed, however, by loosening the studs 118 and shifting the plate member 115 in one direction or the other. The slide 118a is, in this form of the invention, provided at one side with a downturned section 121 that normally rests in the V-shaped ledge section 117. The opposite edge of the slide 118a carries a plurality of shoulder rivets 122. These parts cooperate with the upper portion of a second slide support 124 that is attached to the front side of the hopper 15, as through some of the frame members 125 of the grain drill. The upper edge 126 of the slide support 124 is provided with as many notches or slots 127 as there are rivets, and the portions of the slide support section 126 between the notches 127, indicated at 128, form ledges upon which the shoulder rivets 122 rest and which, at the same time, accommodate any longitudinal adjusting movement of the slide 118a. However, when the slide 118a is shifted to bring the shoulder rivets 122 into the notches or slots 127, the forward edge of the slide 118a drops down, and then the rear portion 121 may be lifted away from the ledge section 117 of the rear slide support 115. Preferably, the front slide support 124 is connected to the frame parts 125 by bolt and slot means indicated generally at 129.

In this form of the invention, a shifter plate 134 is riveted or otherwise firmly fixed to the slide 118a and extends rearwardly therefrom, the rear end being apertured, as at 135, to receive the stem 136 of a nut member 137 having an elongated threaded section 138 that receives the inner threaded end of a fertilizer adjusting screw 139. The outer end of the adjusting member 139 is rotatably anchored by any suitable means to an end bracket 142 that is fixed, as at 143, to the adjacent portion of one of the frame members 144 of the hopper support. By turning the member 139, the slide 118a may be shifted along the ledge sections 117 and 128, as to adjust the amount of discharge from the fertilizer hopper. Movement of the slide beyond the adjusting range brings the shoulder rivets into registration with the notches 127. By loosening the fasteners 118 and 129, the position of the slide-supporting strips 115 and 124 may be adjusted to bring the slide 118a to the proper position relative to the bottom of the hopper.

While I have shown and described above the preferred structure in which the principles of the present invention have been incorporated, it is to be understood that my invention is not to be limited to the particular details, shown and described above, but that, in fact, widely different means may be employed in the practice of the broader aspects of this invention.

What I claim, therefore, and desire to secure by Letters Patent is:

1. The combination with a grain drill including a mobile frame, a rotatable shaft connected therewith, and furrow opener raising and lowering means carried by said frame, of a fertilizer hopper carried by said frame and including gate means adapted to be opened when the furrow opener raising and lowering means is lowered and closed when said furrow opener raising and lowering means is raised, means including a yoke connected with said gate means to open and close the latter, said yoke having opposed portions disposed at opposite sides of said shaft, means connecting said yoke and said furrow opener raising and lowering means for shifting said yoke from one position to the other relative to said shaft when said furrow opener raising and lowering means is operated, and interengaging means on said yoke and shaft whereby rotation of the latter acts, when the furrow opener raising and lowering means is raised, to shift said yoke in one direction and, when said furrow opener raising and lowering means is lowered, to shift said yoke in the opposite direction.

2. In an agricultural implement, a mobile support adapted to be propelled over the ground, dispensing means including flow control means therefor carried by said mobile support, said flow control means being movable between open and closed position, biased overcenter means acting to hold said flow control means in either of its positions, a rotatable part carried for rotation by said mobile support, means connected with said overcenter means and including spaced apart portions, the latter being shiftable into driving engagement with one or the other, optionally, of the generally diametrically opposite portions of said rotatable part whereby said latter means serves to shift said overcenter means from one of its positions past its deadcenter position, and means connected to said shiftable means to shift said portions toward and away from said rotatable part.

3. In an agricultural implement, a mobile support adapted to be propelled over the ground, a controllable operating means movably mounted on said support, a shaft carried by said mobile support and rotatable concomitantly with movement of the mobile support over the ground, a part on said shaft and rotatable therewith, a movably mounted yoke connected with said controllable operating means and having spaced portions disposed on opposite sides of said part, and means connected with said yoke to move one or the other of said spaced portions into driving engagement with one or the other of the generally opposite portions of said part, whereby movement of the latter acts to shift said yoke in one direction or the other.

4. The combination with a grain drill including a mobile frame, a rotatable shaft connected therewith, and furrow opener raising and lowering means carried by said frame, of a fertilizer hopper carried by said frame and including gate means adapted to be opened when the furrow opener raising and lower means is lowered and closed when said furrow opener raising and lowering means is raised, gate-shifting means connected with said gate means to open and close the latter, said gate-shifting means having opposite portions disposed at opposite sides of said shaft, means connecting said gate-shifting means and said furrow opener raising and lowering means for shifting said gate-shifting means from one position to the other relative to said shaft when said furrow opener raising and lowering means is operated, and interengaging means on said gate-shifting means and shaft whereby rotation of the latter acts, when the furrow opener raising and lowering means is raised, to shift said gate-shifting means in one direction, and when said furrow opener raising and lowering means is lowered, to shift said gate-shifting means in the opposite direction.

5. The invention set forth in claim 4, further characterized by means connected with said gate-shifting means to actuate the latter independently of said rotatable shaft.

6. The combination with a grain drill having a mobile support, furrow opener raising and lowering means carried thereby, and a rotatable part connected with said mobile support and rotated concomitantly with movement of said mobile support over the ground, of a fertilizer hopper including flow controlling gate means movable relative to the hopper, means movably carried by said mobile support and connected with said gate means for shifting the latter, gate-shifting means having opposite portions disposed at opposite sides of said rotatable part, said gate-shifting means being connected with said movably carried means and shiftable between one position out of engagement with said rotatable part and another position in driving engagement with said part, for shifting said gate means optionally, and means connecting said furrow opener raising and lowering means with said part-engaging means, whereby the latter means is operative in response to movement of said furrow opener raising and lowering means for shifting said gate means.

References Cited in the file of this patent

UNITED STATES PATENTS

| | | |
|---|---|---|
| 242,063 | Sidener | May 24, 1881 |
| 2,054,723 | Crowley | Sept. 15, 1936 |
| 2,249,376 | Dennis | July 15, 1941 |
| 2,410,937 | Harder | Nov. 12, 1946 |
| 2,630,945 | Gandrud | Mar. 10, 1953 |
| 2,661,125 | Gandrud | Dec. 1, 1953 |
| 2,669,951 | Erwin | Feb. 23, 1954 |
| 2,670,699 | Kriegbaum | Mar. 2, 1954 |
| 2,687,702 | Harper | Aug. 31, 1954 |
| 2,768,773 | Bjerre | Oct. 30, 1956 |